United States Patent
Williams

(10) Patent No.: US 11,884,245 B2
(45) Date of Patent: Jan. 30, 2024

(54) STORAGE OR TOOL BOX LIFT ASSEMBLY FOR AN AUTOMOBILE TOW HITCH RECEIVER

(71) Applicant: Geoffery Allen Williams, Guyton, GA (US)

(72) Inventor: Geoffery Allen Williams, Guyton, GA (US)

( * ) Notice: Subject to any disclaimer, the term of this patent is extended or adjusted under 35 U.S.C. 154(b) by 0 days.

(21) Appl. No.: 17/456,632

(22) Filed: Nov. 27, 2021

(65) Prior Publication Data

US 2023/0166664 A1 Jun. 1, 2023

(51) Int. Cl.
*B60R 9/06* (2006.01)
(52) U.S. Cl.
CPC ....................... *B60R 9/06* (2013.01)
(58) Field of Classification Search
CPC ........................................................ B60R 9/06
See application file for complete search history.

(56) References Cited

U.S. PATENT DOCUMENTS

| | | | | |
|---|---|---|---|---|
| 4,725,189 A * | 2/1988 | Langenfeld | ............. | E02F 3/627 414/703 |
| 5,224,636 A * | 7/1993 | Bounds | ..................... | B60R 9/06 224/521 |
| 5,456,564 A * | 10/1995 | Bianchini | ................. | B60R 9/06 224/508 |
| 6,168,058 B1 * | 1/2001 | Janek | ..................... | B60R 9/065 220/9.3 |
| 6,244,483 B1 * | 6/2001 | McLemore | ............... | B60R 9/10 224/521 |
| 6,435,801 B2 * | 8/2002 | Talbott | .................. | B60P 1/4407 224/521 |
| 6,513,690 B1 * | 2/2003 | Churchill | .................. | B60R 9/06 224/523 |
| 6,725,855 B1 * | 4/2004 | Brennan | ............... | B66F 7/0625 126/41 R |
| 7,377,457 B2 * | 5/2008 | Schierman | ........... | A01D 87/127 241/101.76 |
| 7,396,202 B1 * | 7/2008 | Panzarella | ............. | A61G 3/062 414/641 |
| 8,061,754 B1 * | 11/2011 | Webb | ...................... | B60P 3/122 296/61 |
| 8,132,997 B2 * | 3/2012 | Reuille | ................. | B60P 1/4421 414/545 |
| 9,096,160 B2 * | 8/2015 | Le Anna | ................... | B60R 9/06 |
| 9,738,205 B2 * | 8/2017 | Parker | ................... | B60P 1/4414 |
| 10,328,837 B2 * | 6/2019 | Peles | ..................... | B60P 1/6409 |
| 2003/0011169 A1 * | 1/2003 | McCoy | ..................... | B60D 1/52 280/495 |

* cited by examiner

*Primary Examiner* — Brian D Nash
(74) *Attorney, Agent, or Firm* — Law Offices of John G. Posa

(57) ABSTRACT

A frame that plugs into the tow hitch receiver of a vehicle that has two pivot arms used for the raising of a storage/tool box onto the frame for transport or lowered for placing the storage/tool box on the ground surface shared by the vehicle, at which point the storage/tool box can be disconnected from the frame and later re-attached for lifting and transport. The aforementioned pivot arms of the frame can be activated into motion via a driving force such as but not limited to a gas strut, hydraulics, cable or other means for pivoting the arms in the process of lifting a storage/tool box onto the connected frame for transport, or lowering a storage/tool box for disconnection after transport.

16 Claims, 4 Drawing Sheets

STORAGE OR TOOL BOX LIFT ASSEMBLY FOR AN AUTOMOBILE TOW HITCH RECEIVER

SUMMARY OF THE INVENTION

Invented is a frame that plugs into the tow hitch receiver of a vehicle that has two pivot arms used for the raising of a storage/tool box onto the frame for transport or lowered for placing the storage/tool box on the ground surface shared by the vehicle, at which point the storage/tool box can be disconnected from the frame and later re-attached for lifting and transport. The aforementioned pivot arms of the frame can be activated into motion via a driving force such as but not limited to a gas strut, hydraulics, cable or other means for pivoting the arms in the process of lifting a storage/tool box onto the connected frame for transport, or lowering a storage/tool box for disconnection after transport.

DESCRIPTION OF THE INVENTION

A frame that plugs into the tow hitch receiver of a vehicle that has two pivot arms used for the raising of a storage/tool box onto the frame for transport or lowered for placing the storage/tool box on the ground surface shared by the vehicle, at which point the storage/tool box can be disconnected from the frame and later re-attached for lifting and transport. The aforementioned pivot arms of the frame can be activated into motion via a driving force such as but not limited to ag a s strut, hydraulics, cable or other means for pivoting the arms in the process of lifting a storage/tool box onto the connected frame for transport, or lowering a storage/tool box for disconnection after transport.

Figure 1:
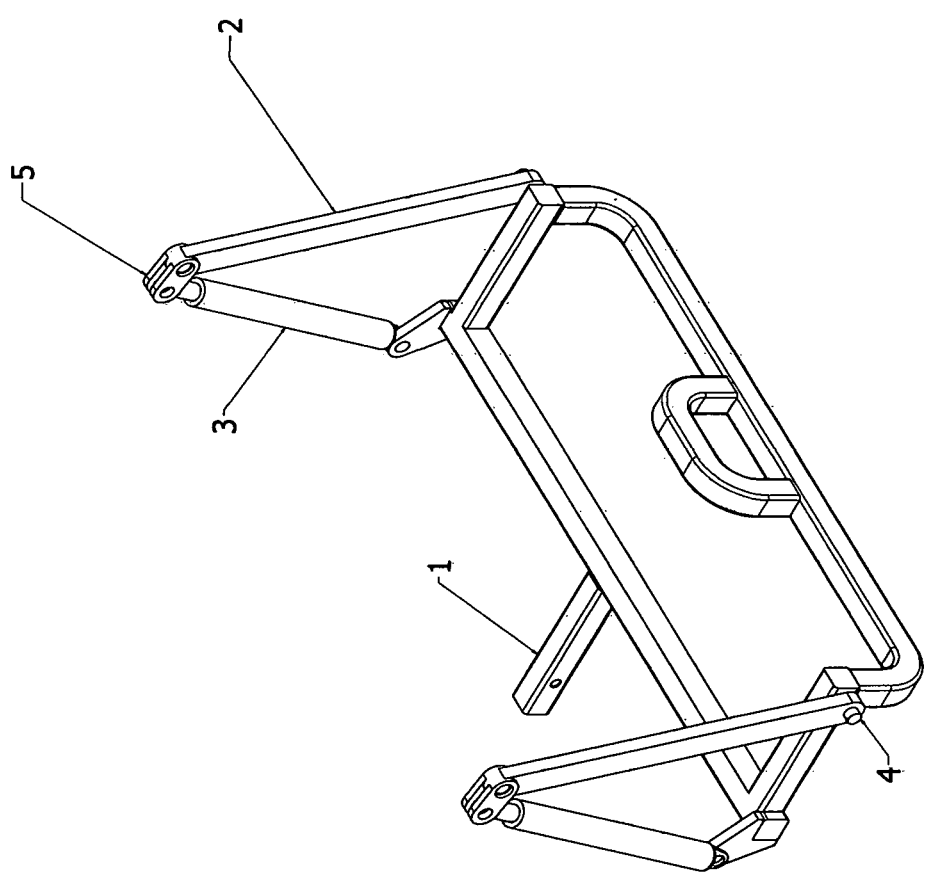
FIG. 1 is an isometric view of the storage/tool box lifting assembly and carrier.

FIG. 1 is anisometric view of the storage/tool box lifting assembly and carrier. It depicts the assembly in its lifted position. Item 1 in the drawing is the frame with a male extension to be received by an existing tow hitch receiver. Item 2 is the pivot arms that are the most essential part in the operation of lifting and lowering. Item 3 is the motion power source of the operation which in this illustration is a gas strut but can be hydraulic, pneumatic, cable driven or other similar power as to the rotation of the pivot arms. Item 4 is the pivot boss that the pivot arms pivot around. Item 5 is a union connection device used to connect the pivot arms to the tool/storage box and joining both to the motion power source.

Figure 2:
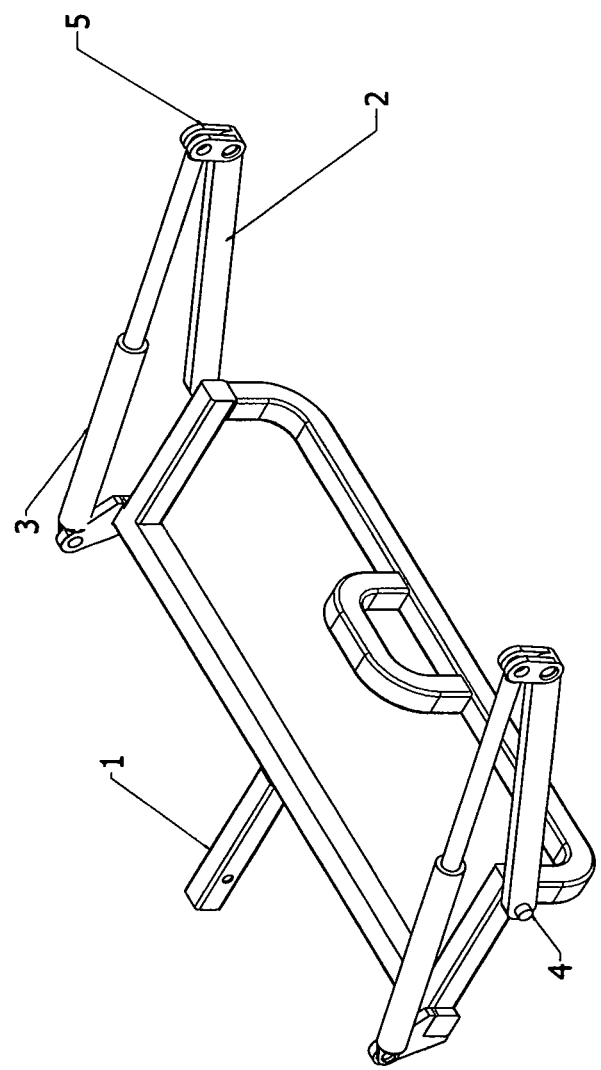
FIG. 2 is an isometric view of the storage/tool box lifting assembly and carrier.

FIG. 2 is an anisometric view of the storage/tool box lifting assembly and carrier. This figure shows the Assembly in the extended lowered position. For reference all numbered items are the same as FIG. 1.

Figure 3:
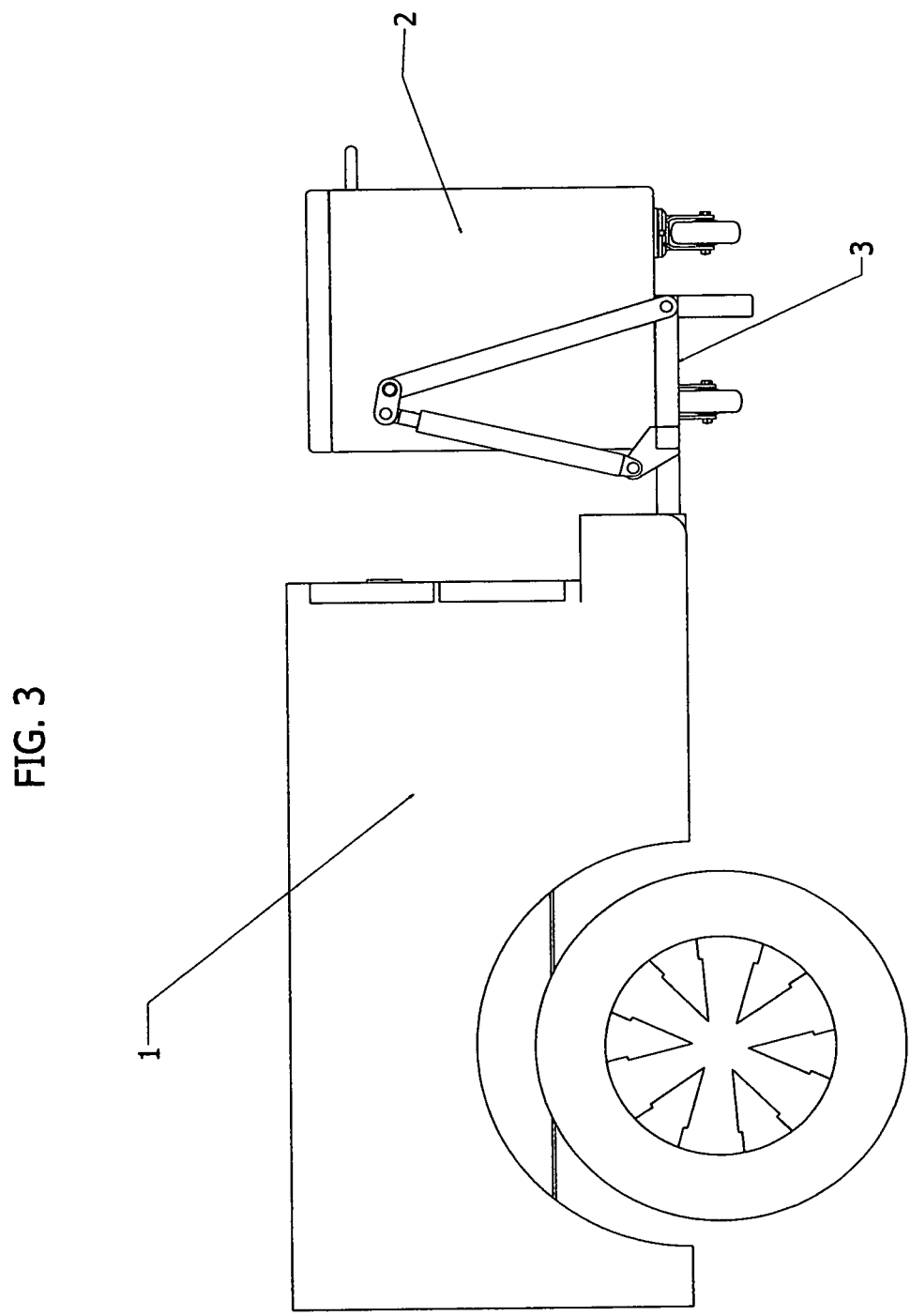
FIG. 3 is a side elevation view of the storage tool box lifting assembly and carrier attached to an automobile and in its raised position.

FIG. 3 is a side elevation view of the storage tool box lifting assembly and carrier attached to an automobile and in its raised position, and Item 1 is the automobile. Item 2 is a storage/tool box. Item 3 is the lifting assembly and carrier.

Figure 4:
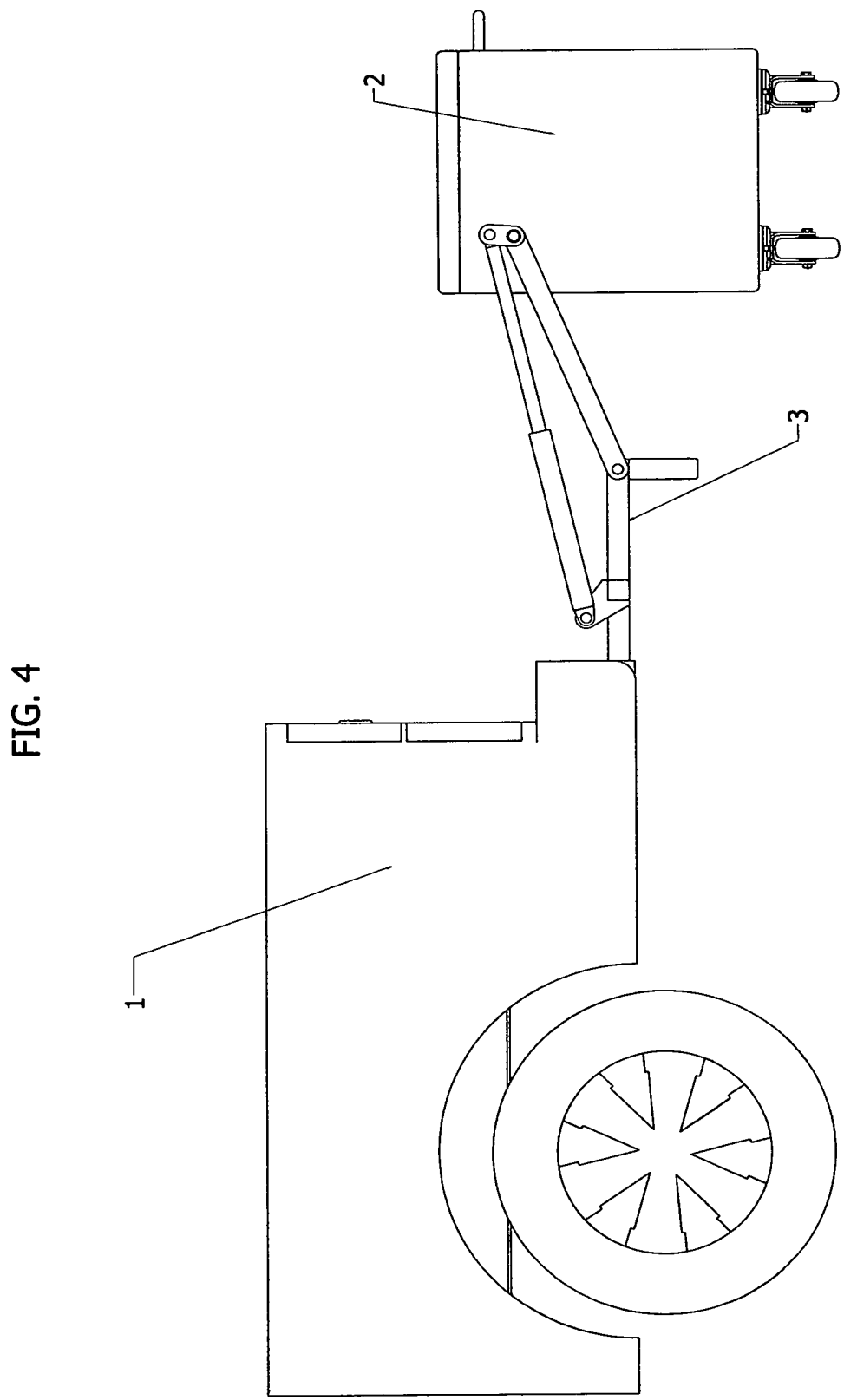
FIG. 4 is a side elevation view of the storage/tool box lifting assembly and carrier attached to an automobile.

FIG. 4 is a side elevation view of the storage/tool box lifting assembly and carrier attached to an automobile. This figure shows the lifting assembly and carrier in its extended/lowered position. For reference all numbered items are the same as FIG. 3.

I claim:

1. Apparatus that connects to an existing automobile tow hitch receiver to transport a tool/storage box, comprising:
   a tool/storage box having a top edge, a bottom panel, and opposing solid side panels, each side panel including a pivoting connection;
   a frame having two integral pivot arms connected for free rotation to the pivoting connections on the opposing side panels of the tool/storage box, whereby the pivot arms are operative to raise and lower the tool/storage box in a colinear direction of the automobile for either transport or disconnection of the tool/storage box;
   wherein the pivoting connections on the side panels of the tool/storage box are positioned closer to the top edge than to the bottom panel, such that the bottom panel remains in a horizontal orientation as the tool/storage box is raised and lowered by the pivot arms of the frame; and
   wherein the pivot arms are activated via gas springs, pneumatics, hydraulics, cable system or other extensible/retractable mechanism.

2. The apparatus of claim 1, further including a rearward member spanning the frame that supports the bottom of the tool/storage box in the transport state.

3. The apparatus of claim 1, wherein the tool/storage box has ground-contacting casters.

4. Apparatus coupled to a receiver hitch for raising and lowering a container with a top edge, a bottom panel, and first and second solid outer panels defining a width, the apparatus comprising:
   a fork-shaped frame having a front member configured to be received by a vehicle receiver hitch, and a pair of right and left spaced-apart rearwardly extending members terminating in right and left ends;
   a pair of pivot arms, each with first and second ends;
   wherein the first end of each pivot arm is pivotably coupled to a respective one of the right and left ends of the fork-shaped frame, such that the pivot arms swing in a vertical plane;
   wherein the second end of each pivot arm is pivotably coupled to a respective one of the first and second outer sides of the container;
   an extensible/retractable mechanism causing both of the pivot arms to swing up and down in parallel fashion between transport and deployed states, and wherein: in the transport state, the container is lifted above a ground surface, and in the deployed state the container is lowered toward a ground surface; and
   wherein the second ends of the pivot arms are coupled for free rotation to the sides of the container toward the top edge of the container such that the bottom panel remains in a horizontal orientation as the tool/storage box is lifted and lowered.

5. The apparatus of claim 4, wherein the extensible/retractable mechanism is gas or pneumatically driven.

6. The apparatus of claim 4, wherein the extensible/retractable mechanism comprises a cable system.

7. The apparatus of claim 4, wherein the extensible/retractable mechanism is hydraulically driven.

8. The apparatus of claim 7, wherein the extensible/retractable mechanism comprises a pair of hydraulic cylinders, each cylinder being connected to the frame and a respective one of the pivot arms.

9. The apparatus of claim 8, wherein:
the fork-shaped frame comprises a front member with right and left ends and two side members extending rearwardly from the right and left ends of the front member; and
the hydraulic cylinders each have a first end pivotably coupled to one of the right and left ends of the front member and a second end pivotable coupled to a respective opposing side of the container.

10. The apparatus of claim 4, further including a rearward member spanning the forks of the frame to supports the bottom of the tool/storage box in the transport state.

11. The apparatus of claim 4, wherein the container has ground-contacting casters.

12. Apparatus coupled to a receiver hitch for raising and lower a container with first and second solid outer side panels, the apparatus comprising:
a fork-shaped frame having a front member configured to be received by a vehicle receiver hitch, and a pair of right and left spaced-apart rearwardly extending members terminating in right and left ends;
a pair of pivot arms, each with first and second ends;
wherein the first end of each pivot arm is pivotably coupled to a respective one of the right and left ends of the fork-shaped frame, and the second end of each pivot arm is pivotably coupled to a respective one of the first and second outer side panels of the container; and
an extensible/retractable mechanism including a pair of hydraulic cylinders, each cylinder being connected between the frame and a respective one of the pivot arms causing the pivot arms to swing up and down between transport and deployed states, and wherein: in the transport state, the container is lifted above a ground surface, and in the deployed state the container is lowered toward a ground surface.

13. The apparatus of claim 12, wherein:
the fork-shaped frame comprises a front member with right and left ends and two side members extending rearwardly from the right and left ends of the front member; and
the hydraulic cylinders each have a first end pivotably coupled to one of the right and left ends of the front member and a second end pivotable coupled to a respective opposing side of the container.

14. The apparatus of claim 12, further including a rearward member spanning the forks of the frame to supports the bottom of the tool/storage box in the transport state.

15. The apparatus of claim 12, wherein the container has ground-contacting casters.

16. The apparatus of claim 12, wherein:
the side panels have upper and lower portions defining a height; and
the pivot arms are coupled toward the upper portions of the side panels such that the bottom of the container remains horizontally oriented as it is raised and lowered.

\* \* \* \* \*